United States Patent Office.

H. S. LESHER, OF GALESBURG, ILLINOIS.

*Letters Patent No. 81,798, dated September 1, 1868.*

---

IMPROVED ANIMAL-TRAP.

---

*The Schedule referred to in these Letters Patent and making part of the same.*

---

TO ALL WHOM IT MAY CONCERN:

Be it known that I, H. S. LESHER, of Galesburg, in the county of Knox, and State of Illinois, have invented certain new and useful Improvements in Mouse-Traps; and I do hereby declare that the following is a full, clear, and exact description thereof, reference being had to the accompanying drawings, and to the letters of reference marked thereon, which form a part of this specification, and in which drawing is represented a vertical section of my rat-trap.

The nature of my invention consists in the employment of a trap having a platform at its entrance, so hinged that when the mouse advances on it to get the bait, the platform will tilt, so as to close the hole through which the mouse entered, and in attempting to escape through a hole in front of him, he will step on a second metal platform, which will precipitate him into a secure chamber, both platforms being returned to their original positions by the action of a spring, in the manner hereinafter described.

To enable those skilled in the art to make and use my invention, I will now describe its construction and operation.

In the accompanying drawings, A represents the box, having at one end a wire grating, and at the other an opening, $b$, through which the mice can enter.

$c$ is a partition, dividing the box into two nearly equal parts.

$d$ is a lateral bar, placed directly over the partition $c$, and secured to the upper edges of the box A.

To this bar are hinged the lids $e\ e'$, which are confined down by means of hooks and staples.

$g$ represents a platform, hinged to the bar $h$, the platform being so placed as that the outer end will be sufficiently heavy to tilt the platform in an inclined position, and thereby causing its outer end to rest on the floor of box A.

$i$ represents a small metal rod, occupying a vertical position, and passing through a hole, $j$, in the platform, the upper end of this rod being hooked inward, so as to catch, when required, on the platform, and hold it nearly in a horizontal position. The rod $i$ at its lower end is looped, to admit the spring $m$ to pass through it, and is kept in position by guides $n\ n$.

R represents a metal plate, hinged in the opening in partition $c$. The end of the plate R next to the platform $g$ is bent downwards at right angles with its upper surface, and is kept in a horizontal position by a wire which is attached to it, the said wire being made to pass around the spring $m$.

The plate R extends some distance into the rear compartment of the box, which is furnished with wire grating, as already described, and has in front of its end a shield, L, to prevent the animal, when once entrapped, from retracing his steps.

The operation of my trap is as follows: The animal enters the opening $b$, and ascends in pursuit of the bait, which is suspended from the staple $s$. The moment he passes sufficiently far to bring the platform $g$ in a horizontal position, the hook on rod $i$ will catch on the face of the platform, and keep it in the said position until the animal, finding the hole closed through which he entered, will seek egress through the hole in front of said platform, and in doing so treads on the plate R, which, upon his advancing beyond its centre, will tilt up and precipitate him into the confined chamber with wire bars, and thus prevent his escape.

By the tilting of the plate R, the wire attached to its inner end will raise the spring, and the elevation of the spring will raise rod $i$, and disengage it from platform $g$, so that both plate R and platform $g$ will return to their original position, and the trap may be again set.

What I claim as new, and desire to secure by Letters Patent, is—

1. The tilting-platform $g$, so arranged in combination with the trigger $i$ and spring $m$, that when the animal presses the platform down, it is retained in position to prevent its escape.

2. The hinged plate R, so arranged in combination with spring $m$, trigger $i$, and tilting-platform $g$, that when the animal seeks escape over the plate R, the tilting-platform will be liberated, thus allowing it to fall to its original position.

In testimony that I claim the foregoing as my own, I affix my signature in presence of two witnesses.

H. S. LESHER.

Witnesses:
G. C. LANPHERE,
GEO. J. BERGEN.